United States Patent Office 3,560,503
Patented Feb. 2, 1971

3,560,503
DI-LOWER ALKYL-SUBSTITUTED OCTAHYDRO-PYRAZINOPYRIMIDINONES
Nitya Anand, Ranjit Kumar Chatterjee, Raman Narayana Iyer, Ranjana Saxena, and Amiya Bhushan Sen, Lucknow, India, assignors to Council of Scientific and Industrial Research, New Delhi, India
No Drawing. Filed Sept. 18, 1968, Ser. No. 760,704
Int. Cl. C07d 57/24
U.S. Cl. 260—256.4         2 Claims

ABSTRACT OF THE DISCLOSURE

Substituted piperazinopyrimidinones such as 2-ethyl-6-methyl - 2,3,4,4a,5,6,7,8 - octahydro-1H-pyrazino[1,2-c]pyrimidin-1-one which have utility as antifilarial agents.

---

This invention relates to compositions of matter classified in the art chemistry as substituted piperazinopyrimidinones.

The invention sought to be patented is described as residing in the concept of a chemical compound having a molecular structure wherein there is attached to the 2,3,4,4a,5,6,7,8 - octahydro - 1H - pyrazino[1,2-c]pyrimidin-1-one nucleus at each of the 2- and 6-positions a lower alkyl substituent.

As used throughout this application the terms "lower alkyl" and "lower alkoxy" embrace both straight and branched chain alkyl and alkoxy radicals, respectively, containing from 1 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl, and the like in the case of "lower alkyl," and methoxy, ethoxy, n-propoxy, isopropoxy, n-butoxy, tert-butoxy, n-amyloxy, sec-amyloxy, n-hexyloxy, 2-ethylbutoxy, 2,3-dimethylbutoxy, and the like in the case of "lower alkoxy," and the term "halo" embraces chloro, bromo, iodo and fluoro.

Analytical data, including elemental composition, melting or boiling points, infrared and ultraviolet spectral and nuclear magnetic resonance data, taken together with the nature of the starting materials and mode of synthesis, positively confirm the structure of the compounds sought to be patented.

The tangible embodiments of this invention possess the inherent applied use characteristics of having significant pharmacological activity without adverse toxicity in combating various helminthic parasites, in particular those of the genus Filaria. For example, the compound 2-ethyl-6-methyl-2,3,4,4a,5,6,7,8 - octahydro - 1H - pyrazino[1,2-c]pyrimidin - 1 - one, when administered intraperitoneally as the free base at a dose of 1 mg./kg. daily to cotton rats infested with *Litomosoides carinii* was found to have an effect in reducing the number of microfilariae in both circulating blood and subcutaneous tissue that is comparable to that produced by the intraperitoneal administration of 3.12 mg./kg. twice daily of the hydrochloride salt of the well-known antifilarial agent diethylcarbamazine, and in addition was found also to be effective in adult forms of the parasitic organism in preventing reproduction.

The manner and process of making and using the invention will now be generally described so as to enable a person skilled in the art of chemistry to make and use the same as follows:

The reaction sequence leading to the preparation of the tangible embodiments of this invention is set forth as follows:

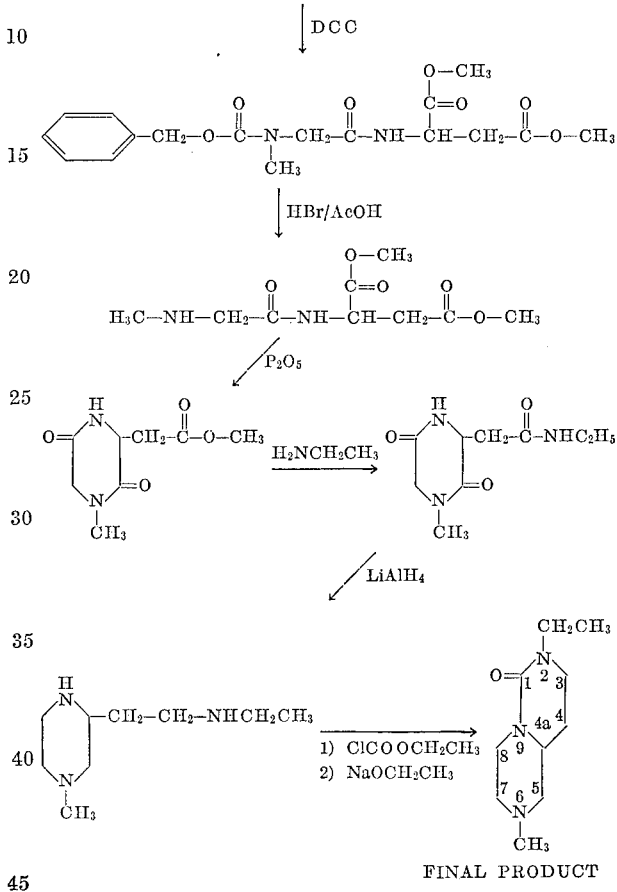

FINAL PRODUCT

The N-benzyloxycarbonyl-N-lower alkylamino acetic acid, such as the specific N-benzyloxycarbonyl sarcosine shown in the above-depicted reaction sequence, and the dimethyl aspartate starting materials are known compounds that are readily commercially available.

In accordance with the above-described reaction sequence the N-benzyloxycarbonyl-N-lower alkylamino acetic acid and dimethyl aspartate starting materials are condensed to form an aspartic acid dimethyl ester amide of N-benzyloxycarbonyl-N-lower alkylamino acetic acid. The condensation is conveniently carried out at at temperature of about 0° C. in an inert solvent such as, for example, anhydrous ethyl acetate by treatment with dicyclohexylcarbodiimide.

The amide condensation product thus formed is then treated with hydrobromic acid at a temeprature of up to 20° C. with ammoniated chloroform to cleave the benzyloxycarbonyl group and yield an aspartic acid dimethyl ester amide of N-lower alkylamino acetic acid. If preferred, the cleavage of the benzyloxycarbonyl group may be achieved by a catalytic hydrogenation, wherein an aspartic acid dimethyl ester amid of N-benzyloxycarbonyl-N-lower alklamino acetic acid is shaken with hydrogen at between 40 and 50 p.s.i. pressure, at a temperature of 70° C. and in the presence of a finely divided metal catalyst such as, for example, platinum or palladium.

Treatment of the aspartic acid dimethyl ester amide of N-lower alkylamino acetic acid with phosphorus pentoxide under reduced pressure results in ring closure and formation of a 4-lower alkyl-3,6-dioxo-2-piperazine acetic acid methyl ester which is then heated with an appropriate lower alkylamine to yield the corresponding lower alkylamide of 4-lower alkyl-3,6-dioxo-2-piperazine acetic acid. The reaction is preferably carried out in the presence of an inert organic solvent such as, for example, absolute ethanol.

The lower alkyl amide thus formed is then subjected to electrolytic reduction or, if preferred, to treatment with a metal hydride reducing agent such as, for example, lithium aluminum hydride, in the presence of an inert organic solvent such as, for example, tetrahydrofuran, ether and the like, to yield a 1-lower alkyl-3-(2-lower alkylamino) ethylpiperazine.

Ring closure and formation of the final 2- and 6-lower alkyl substituted 2,3,4,4a,5,6,7,8-octahydro-1H-pyrazino-[1,2-c]pyrimidin-1-one product is accomplished by successive treatment of the 1-lower alkyl 3-(2-lower alkylamino)ethylpiperazine first with ethyl chloroformate in an acid medium at about 0° C. to form an N-ethoxycarbonyl derivative which is then treated with an alkali metal alkoxide such as, for example, sodium or potassium methoxide or ethoxide, in the presence of a lower alcohol such as methanol or ethanol to effect ring closure. The product is recovered as an acid addition salt and purified by conventional techniques of separation and crystallization.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the sulfate, phosphate or the like. They may also comprise salts with organic acids, including monobasic acids such as the acetate or the propionate, and especially those with hydroxy acids, and polybasic acids, such as citrate, tartrate, malate and maleate. Pharmaceutically, the salt will not be substantially more toxic than the compound itself and, to be acceptable, should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The individual unit dosage and frequence of administration of the compounds according to the present invention will be determined in part by the nature and severity of the filarial infestation for which the administration of an antifilarial agent is indicated. It will also depend upon such factors as age, weight, species, underlying physical condition and selected route of administration. The exact amount to be administered should be non-toxic, pharmaceutically effective in providing the degree of antifilarial activity desired.

The best mode contemplated by the inventors for carrying out the invention will now be set forth as follows:

EXAMPLE 1

(a) Aspartic acid dimethyl ester amide of N-benzyloxycarbonylsarcosine

A solution of N,N'-dicyclohexylcarbodiimide (12 g.) in dry ethyl acetate (20 ml.) was added dropwise at 0–5° to a stirred solution of benzyloxycabonylsarcosine (12 g.) and dimethyl aspartate (8.6 g.) in dry ethyl acetate (30 ml.). The mixture was stirred for an additional 2 hours at 0° and left overnight. The reaction mixture was treated with glacial acetic acid (1 ml.) to decompose any untreated N,N'-dicyclohexylcarbodiimide and stirred at 0° for one hour, the precipitated dicyclohexylurea removed by filtration, the precipitate washed with ethyl acetate (10 ml.), the combined filtrates washed succesively with water, 1.0 N hydrochloric acid, 1.0 N sodium hydroxide solution and saturated solution of sodium chloride and dried over anhydrous sodium sulfate. The solvent was removed under reduced pressure to give the product as a thick oil; yield 16.2 g. (83%).

(b) Aspartic acid dimethyl ester amide of sarcosine

A solution of the aspartic acid dimethyl ester amide of N-benzyloxycarbonyl sarcosine (16 g.) in glacial acetic acid (40 ml.) was treated with 4 N hydrobromic acid in acetic acid (40 ml.) and the mixture kept at 20° for one hour. Excess dry ether was added and the precipitated hydrobromide, after washing 4–5 times with dry ether was dried, suspended in dry chloroform and treated with chloroformic ammonia, the precipitated ammonium chloride removed by filtration and the solvent removed to give the aspartic acid dimethyl ester amide of sarcosine as a thick oil; yield 8 g. (80%).

(c) 4-methyl-3,6-dioxo-2-piperazine acetic acid methyl ester

The aspartic acid dimethyl ester amide of sarcosine was kept over phosphorus pentoxide in a vacuum desiccator for 48 hours to give the product as a colorless solid which was crystallized from benzene; yield 4 g. (60%); M.P. 98°. It gave deep red color, characteristic of dioxopiperazines, with a solution of sodium carbonate and picric acid.

(d) Ethylamide of 4-methyl-3,6-dioxo-2-piperazine acetic acid

A solution of 4-methyl-3,6-dioxopiperazine- acetic acid methyl ester (1 g.) and ethylamine (0.7 ml.) in absolute ethanol (25 ml.) was heated in a sealed tube at 130° for 36 hours. Removal of the solvent and trituration of the residual oil with dry ether gave the ethylamide of 4-methyl-3,6-dioxo-2-piperazine acetic acid as an amorphous solid which was crystallized from methanol-ether; yield 0.7 g. (70%), M.P. 104°. It gave red color characteristics of dioxopiperazines when heated with a solution of sodium carbonate and picric acid.

(e) 1-methyl-3-(2-ethylamino)ethylpiperazine

A solution of the ethylamide of 4-methyl-3,6-dioxo-2-piperazine acetic acid (2 g.) in dry tetrahydrofuran (20 ml.) was added to a stirred suspension of lithium aluminum hydride (0.7 g.) in dry tetrahydrofuran and the mixture was refluxed for 100 hours. The reaction mixture was cooled in ice, diluted with ether (30 ml.), excess hydride and the complex decomposed by careful addition of water (2 ml.). The inorganic salts obtained by filtering the mixture were extracted with ether in a Soxhlet extractor. The combined filtrate and Soxhlet extract was dried over anhydrous sodium sulfate and the solvent removed to give the amine as an oil; yield 0.83 g. (55%). The amine readily forms a carbonate if exposed to air. Hydrochloride, M.P. 213–15° (d.) (sealed tube); picrate, M.P. 240° (d.).

(f) 2-ethyl-6-methyl-2,3,4,4a,5,6,7,8-octahydro-1H-pyrazino[1,2-c]pyrimidin-1-one To a mechanically stirred solution of the 1-methyl-3-(2-ethylamino)ethyl-piperazine (0.5 g.) in water (10 ml.), hydrochloric acid was added to bring the pH of the solution to 3–3.5 and the solution cooled to 0°. Ethyl chloroformate (0.3 ml.) was added under stirring and the pH maintained at 3–3.5 by the addition of sodium acetate solution. Stirring was continued for one hour after which the reaction mixture was saturated with potassium carbonate. The separated oil was extracted with other (3×10 ml.), the combined extracts dried over anhydrous sodium sulfate and the solvent removed. The oil so obtained was dissolved in benzene, chromatographed over neutral alumina using benzene as the eluant; yield 0.5 g. (70%).

A solution of the carbamate thus formed (1 g.) and sodium ethoxide (from sodium 0.09 g. in absolute ethanol 20 ml.) in ethanol was refluxed for 36 hours, the solvent removed, water (2 ml.) added to the residue and the mixture extracted with methylene chloride (4×10 ml.). The combined extracts were dried over anhydrous sodium sulfate and the resulting oil chromatographed over neutral alumina using benzene as the eluant. Removal of the solvent in vacuo gave the product as a plate yellow oil, yield 0.6 g. (75%).

The product was converted to the hydrochloride salt (M.P. 142° C. after shrinking at 68° C.) by adding an equivalent quantity of methanolic hydrochloric acid to the amine in methanol.

*Analysis.* — Calculated for $C_{10}H_{19}N_3O \cdot HCl \cdot \tfrac{1}{2}H_2O$ (percent): C, 49.48; H, 8.65; N, 17.39. Found (percent): C, 49.81; H, 8.35; N, 17.53.

The following examples present pharmacological data establishing the antifilarial activity of 2-ethyl-6-methyl-2,3,4,4a,5,6,7,8-octahydro - 1H-pyrazino[1,2 - c]pyrimidin-1-one, designated in the examples as the "test compound."

EXAMPLE 2

Acute toxicity determinations in accordance with standard pharmacological test procedures, made for the "test compound" according to the present invention and for the known antifilarial agent diethylcarbamazine (N,N-diethyl-4-methyl-1-piperazine carboxamide) revealed the following:

| Compound | Route of administration | Animal | $LD_{50}$, mg./kg. |
|---|---|---|---|
| Diethylcarbamazine | Intraperitoneal | Mouse | 241 |
| Test compound | do | do | 275 |
| | Parenteral oral | Rat | 600 |

EXAMPLE 3

The antifilarial activity of the "test compound" was determined in cotton rats, experimentally infested with *Litomosoides carinii* according to the method of Hawking and Sewell (Brit. J. Pharmacol. 3:285 (1948); 5:239 (1950)). After the infestation was well established the "test drug" was administered daily intraperitoneally or orally for six days and blood samples were examined for microfilarial count. A second group of animals were similarly treated with diethyl carbamazine as a positive control, and a third group of animals were employed as an untreated control. The results were as follows:

[The effect of 2-ethyl-6-methyl-2,3,4,4a,5,6,7,8-octahydro-1H-pyrazino[1,2-c]pyrimidin-1-one on microfilarial infestation in the cotton rat]

| Group | Route of administration | Dosage, mg./kg./day | Microfilarial/5mm.³ blood Before drug | Microfilarial/5mm.³ blood After 6 days treatment | Percent change |
|---|---|---|---|---|---|
| Untreated control | | | 447 | 900 | +101 |
| Diethylcarbamazine* | Intraperitoneal | 3.0 | 724 | 161 | −78 |
| | | 1.0 | 896 | 401 | −55 |
| Test compound | do | 1.0 | 432 | 39 | −91 |
| | Parenteral oral | 1.0 | 418 | 84 | −80 |

*As the hydrochloride.

These results show the "test compound" to be as good or better than the known antifilarial compound diethyl carbamazine in treating microfilarial infestation in the cotton rat.

The subject matter which the applicants regard as their invention is particularly pointed out and distinctly claimed as follows:

1. 2,6-di-lower alkyl-2,3,4,4a,5,6,7,8-octahydro-1H-pyrazino [1,2-c]pyrimidin-1-one.

2. 2-ethyl-6-methyl-2,3,4,4a,5,6,7,8-octahydro-1H - pyrazino[1,2-c]pyrimidin-1-one.

References Cited

UNITED STATES PATENTS 3,320,256   5/1967   Duschinsky et al. ___ 260—256.4

ALEX MAZEL, Primary Examiner

R. J. GALLAGHER, Assistant Examiner

U.S. Cl. X.R.

260—250, 471, 482; 424—251